US005609711A

United States Patent [19]

Miller

[11] Patent Number: 5,609,711
[45] Date of Patent: Mar. 11, 1997

[54] METHOD OF BONDING LAMINATES USING PREGELATINIZED STARCH

[76] Inventor: Ray R. Miller, 8816 Warren Dr. NW., Gig Harbor, Wash. 98335

[21] Appl. No.: 574,270

[22] Filed: Dec. 18, 1995

Related U.S. Application Data

[63] Continuation-in-part of Ser. No. 444,936, May 19, 1995, abandoned, which is a continuation-in-part of Ser. No. 263,360, Jun. 21, 1994, abandoned.

[51] Int. Cl.[6] .................................................. B31F 5/04
[52] U.S. Cl. .................... 156/292; 156/210; 156/244.22; 156/336; 106/214.2; 106/210.1
[58] Field of Search .................................. 156/210, 205, 156/336, 292, 208, 244.22; 106/213; 428/152–154, 535, 34.2, 182

[56] References Cited

U.S. PATENT DOCUMENTS

| | | | |
|---|---|---|---|
| 3,518,142 | 6/1970 | Dooley | 156/205 |
| 3,524,750 | 8/1970 | Billy | 106/213 |
| 3,690,981 | 9/1972 | DiFrank et al. | 156/336 |
| 3,972,763 | 8/1976 | Wolvin et al. | 156/210 |
| 4,086,116 | 4/1978 | Yazaki et al. | 156/244.22 |
| 4,223,633 | 9/1980 | Alvensleben et al. | 118/203 |
| 4,232,047 | 11/1980 | Sair et al. | 426/96 |
| 4,508,773 | 4/1985 | Maxwell | 428/198 |
| 4,673,438 | 6/1987 | Wittwer et al. | 106/126 |
| 4,855,354 | 8/1989 | Mohler et al. | 525/54.24 |
| 4,913,924 | 4/1990 | Moore | 426/578 |
| 5,316,828 | 5/1994 | Miller | 428/182 |
| 5,454,862 | 10/1995 | Jansen et al. | 106/213 |

*Primary Examiner*—Geoffrey L. Knable
*Attorney, Agent, or Firm*—Keith D. Gehr

[57] ABSTRACT

A method whereby a significantly pregelatinized starch bearing adhesive composition may be used for bonding two laminae such as corrugated board or other panel products. A feed stream of essentially ungelatinized starch is sent to an application device. There it is significantly gelatinized within the application device and applied to the substrate laminae. The adhesive at the time of application is no longer a liquid, but is a partial gel, a gel, or a thermally melted composition. The adhesive is extruded onto the substrate as a multiplicity of parallel beads or as a full width ribbon. Temperature of the melted starch composition may be reduced prior to extrusion to limit puffing or expansion of the extrudate. The resulting laminae may be pressed tightly face to face or they may remain somewhat spaced apart by the beads of adhesive. The method allows the use of both refined and unrefined starch bearing materials to be used in the adhesive composition.

24 Claims, 5 Drawing Sheets

METHOD OF BONDING LAMINATES USING PREGELATINIZED STARCH

This application is a continuation-in-part of U.S. patent application Ser. No. 08/444,936, filed May 19, 1995, now abandoned, which was a continuation-in-part of U.S. patent application 08/263,360, filed Jun. 21, 1994, now abandoned. The invention relates to an adhesive bonding system for laminates such as corrugated paperboard products, for joining other substrates in continuous industrial bonding systems of composite panels, and to the products produced by the method.

BACKGROUND OF THE INVENTION

The system presently in general use for manufacture of corrugated board involves the application of an essentially ungelatinized starch adhesive to the tips of the corrugated medium flutes. This is applied by means of a rotating glue roll running in a pool of the adhesive and transferring the adhesive to the flute tips. The mechanics, chemistry and physical dynamics of the system are described in a reference document entitled *Corrugating Adhesives Seminar*, published by the National Starch and Chemicals Company, Bridgewater, N.J. (1987). Even though it is almost universally practiced, in order to be operated successfully the present system has some well known problems and sensitivities which must be accounted for. These factors create limitations, or potential limitations in the manufacturing process, especially as to the speed of operation and various product deficiencies such as inconsistency of adhesion of the plies of the board.

Other adhesive application systems have been proposed but these have not received significant acceptance. As one example, Wolvin, et al., U.S. Pat. No. 3,972,763, and Alvensleben et al., U.S. Pat. No. 4,223,633, show a system of placing localized spots of a hot melt adhesive along the flute tips of the corrugated medium by the use of a specially constructed glue roll system. Dooley, U.S. Pat. No. 3,518,142 in FIG. 6, displays a manifold which extrudes a full sheet width ribbon of hot melt adhesive onto the flute tips. The device is presented as an alternative to the use of a transfer roll to apply the adhesive. Hot melt adhesives, as used in Wolvin and Dooley, are relatively expensive and the high cost has greatly limited their use.

Miller, in U.S. Pat. No. 5,316,828 teaches an adhesive system comprising continuous parallel beads of adhesive applied to the corrugated medium transverse to the flutes of the medium. Hot melt adhesives can be used in this application, but are relatively expensive. The customary starch adhesive used for corrugated board has not been fully satisfactory because the adhesive does not hold its shape well, and too much water is conveyed to the board. This tends to cause problems in drying and may cause subsequent warpage.

It is known to heat and cool a melted starch solution within a given processing cycle. As one example, Wittwer et al., U.S. Pat. No. 4,673,438, melt a starch solution and inject it into a mold cavity where it is cooled to solidify the composition into a useful molded part, such as a capsule. Moore, in U.S. Pat. No. 4,913,924, describes manufacture of edible gel pieces of a starch composition. This involves heating the composition to a flowable condition at 290°–340° F. and subsequent cooling to a suitable viscosity for molding. Sair et al., in U.S. Pat. No. 4,232,047 describe manufacture of an encapsulated food additive within a matrix such as starch. A mixture of additive and matrix is heated up to 300° F. or higher with subsequent cooling below 212° F. before exiting the extruder. This eliminates the expansion or "puffing" of the product experienced at higher exit temperatures.

SUMMARY OF THE INVENTION

The present invention provides an improved adhesive system for making corrugated board, and other types of panel products. The system overcomes many of the intrinsic problems and limitations of the present conventional practice in making corrugated board. Further, it provides for making novel constructions of composite panels. The invention comprises the use of a starch bearing composition as adhesive. This is applied as extruded parallel beads or as a continuous full width ribbon, applied transverse to the laterally oriented flutes of corrugated board or transverse to a cross machine line of continuous panel manufacture. The present invention is further distinguished by accomplishing a significant gelatinization of the starch composition within the adhesive application device when the composition is supplied to the device as an essentially ungelatinized starch bearing composition. This is in contrast to conventional corrugated board manufacture in which an essentially ungelatinized starch composition is applied to the board components. Conventional practice is to have about 20% of the starch gelatinized (cooked) as a so-called carrier component to suspend the balance of the starch which remains in granular ungelatinized form. An equivalent so called "no carrier system" only partially gelatinizes the starch. Either system serves to control viscosity and prevent solids from settling. These systems, in which only about 20% of the starch is gelatinized, are characterized herein as being essentially ungelatinized. Significant further gelatinization by externally applied heat must occur to achieve adhesion. In conventional practice the adhesive, consisting of the carrier and ungelatinized starch suspension, is applied at a viscosity of generally about 40 to 60 seconds measured by the industry standard liquid viscosity Stein-Hall cup method having a scale of 15 to 200 seconds.

The present invention in all cases achieves a degree of gelatinization causing a viscosity greater than 200 seconds by the Stein-Hall cup method. The term "significant gelatinization" is considered hereafter to mean a starch adhesive which has a Stein-Hall cup viscosity greater than 200 seconds. Otherwise stated, the viscosities are above the range measurable by the Stein-Hall cup method. Thus, in the present invention, the composition after significant gelatinization, is not then a liquid, but can be considered a gel.

The present invention comprises an adhesive system with a broad range of capabilities. When continuously extruded parallel beads are produced, there are three modes of application. They may be applied as continuous beads on corrugated board or other panels for reinforcement and/or adhesion and/or spacing of the plies. In this case the beads will be on the tops and in the valleys of the times. They may also be applied as discontinuous beads present only on the flute tips of the corrugated medium of corrugated board and absent in the lower portions of the flute valleys. They may also be applied as wide beads on each side of a corrugated core member of a panel so that, when viewed in plan, the gaps between spaced apart, parallel beads on one side of the corrugated core member are covered by the parallel beads on the other side of the core member. The composition may also be extruded as a full width continuous ribbon or discontinuous on the flute tips only.

The term "continuously extruded" should be construed with sufficient breadth to encompass such applications as the manufacturers joint or flaps of corrugated containers where flow may be interrupted by the application valve.

Where continuous beads have been used, occasionally problems have been encountered in scoring and subsequent folding of the board. This problem is completely prevented by the use of discontinuous beads.

A wide range of degree of gelatinization and application temperature is useful for various applications. Density, strength, adhesivity, moisture level and viscosity level of the adhesive are all important variables over that range. Lower levels of gelatinization, either as uniform partial gelatinization or as differential gelatinization across the bead can be very useful to keep adhesivity adequately high at lower bead moisture levels. For example, selected locations across the bead may be nearly ungelatinized adjacent to fully gelatinized zones. Another useful mode is to further heat the starch composition beyond the temperature where significant gelatinization first occurs to a temperature near or above the melting temperature of the starch composition, in order to increase adhesivity and decrease the applied viscosity while keeping moisture content at a desired low level. This will usually need to be done under superatmospheric pressures since fusion typically occurs above the boiling point of the mixture. A condition intermediate to the two above would be complete significant gelatinization of the starch composition at low moisture levels, a condition which reduces adhesivity, and to apply supplemental beads of a known adhesive to adhere the primary starch composition beads to the plies to be bonded. This supplemental adhesive could be any known adhesive, such as a starch bearing composition, a polymer emulsion such as polyvinyl acetate or polyvinyl alcohol, or other compositions.

The starch bearing composition may be heated well beyond the gelatinization temperature to reduce the viscosity of the composition and enhance its tack or adhesivity. Extrusion at such elevated temperature above the boiling point causes expansion and density reduction or "puffing" of the composition due to flashing of the contained water as steam. This can be advantageous or disadvantageous depending on the application at hand. Where such puffing is disadvantageous, a cooling step can be incorporated following the heating cycle prior to the composition exiting the application device. The extent of cooling can be selected to produce the desired degree of puffing. Puffing can be essentially eliminated by cooling to or just below the atmospheric pressure boiling temperature of the starch bearing composition. In most cases the composition will be cooled below about 150° C. (300° F.) before application to limit puffing to the desired degree.

Typical starch bearing compositions fortuitously exhibit significant hysteresis of viscosity change in the heating and cooling cycle. Viscosity increase versus temperature reduction in the cooling step is not as great as viscosity decrease versus temperature rise in the heating step. This enables achieving a reduced viscosity and increased tack of the starch composition, at a given temperature, by incorporating the heating/cooling cycle.

As noted in the background section, the processes of Wittwer et al., Moore, or Sair et al. all employ a heating/cooling cycle to achieve a condition of a starch-containing composition in which the product is solid and non-sticky. Their products, whether capsule, edible gel piece, or encapsulated flavoring agent, can be handled easily as discretely separated non-adhering product pieces. The present invention has a completely different objective and therefore a somewhat different heating/cooling cycle than those of the references cited. The present objective is to reduce the viscosity and increase the tack and adhesivity of the starch gel at an appropriate temperature. The reduced viscosity makes the composition easier to apply and the increased tack improves effectiveness as an adhesive, especially when operating in a temperature range near or above the atmospheric pressure boiling point around 100° C. There would not normally be a reason to cool much below this temperature. However, higher temperatures are permissible if some degree of puffing of the extrudate is desired or permissible. The fact of reduced viscosity at a given temperature of a heat/cool cycle vs. a heat only cycle can permit a higher solids content of the starch composition. This is highly advantageous as it reduces the amount of water put into the corrugated board. Water applied with the adhesive must be later removed. In general, susceptibility to board warpage increases in proportion to the amount of water added with the adhesive.

By virtue of the use of the starch based adhesive composition the products of the invention have the advantage that they are readily repulpable. Lack of ready repulpability of trim and recycled materials bonded with the usual hot melt adhesives had been a serious problem.

Even more basic than the impact on the use of additives, the flexibility of the present invention permits the use of a wide range of starch sources. Any refined starch can be used such as from corn, wheat, potato, tapioca, sago, etc. Unrefined or less refined sources can also be used, such as corn flour, a dry milling product which is typically about 82% starch. Many partially refined grain products can be used. These latter noted products are defined herein as "starch bearing compositions". While reference has been made to corrugated board manufacture, other laminae or plies are also suitable. These would include either planar or irregular surfaced materials such as wood, plastic, metal, or paper.

It is an object of the invention to provide a method of continuously bonding laminates using parallel spaced apart beads of a significantly gelatinized starch composition as a primary adhesive.

It is another object to create adhesive beads of a significantly gelatinized starch composition that will essentially hold their extruded cross sectional shape until forcibly reshaped.

It is a further object to provide a starch adhesive system for bonding laminae that will minimize transfer of water to the plies of material being joined.

It is still another object to provide a method for making corrugated board in which the adhesive material forms supporting shapes in the valleys of the corrugating medium flutes to increase flat crush resistance of the product.

It is yet another object to provide an adhesive system for joining two essentially continuous plies of material in a spaced apart fashion in which the adhesive forms the major structural element spacing the plies.

It is also an object to provide an adhesive system suitable for corrugated board for making normal and light duty boxes, which does not inhibit the making of cross machine direction folds or creases in the board.

It is also an additional object to provide an adhesive system for corrugated board or panels such that the adhesive beads are adequate to bear all shear forces to be imposed on the product, and the corrugated core member may be assumed to bear no shear forces except those parallel to the contact surfaces between the beads and the core member.

It is an important object to provide an adhesive system for a corrugating plant which will be simpler to operate than usual practice in being less sensitive to starch quality, adhesive solids, adhesive viscosity, applicator conditions, wetting, diffusion and adsorption time, paperboard absorbency and paperboard temperature.

It is an object to provide an adhesive system using a low cost adhesive for direct replacement of higher cost adhesives in various applications.

These and many other objects will become readily apparent upon reading the following detailed description taken in conjunction with the drawings.

DETAILED DESCRIPTION OF THE PREFERRED EMBODIMENTS

Starch gelatinizes at about 75° C. The gelatinization temperature can be reduced to as low as 59° C. with caustic, but such additives would usually not be necessary with the present invention. Starch composition melting temperatures are usually in the range of 150° C. to 240° C., depending on the nature of the composition and the moisture content. These melting temperatures are on the basis of the starch composition being under suitable hydraulic pressure, as starch will dry and begin to char when heated to these temperatures under atmospheric conditions.

Starch is a remarkably versatile material. The present invention permits taking advantage of that versatility. Additives can be included for increasing water resistance, improving water solubility, increased strength, decreased density, greater plasticity, as well as for modifying other properties. Inert fillers; e.g., clay, wood flour, can be added for economy and bulk. Normal corrugated practice uses caustic and borax for control of gelatinization temperature, viscosity and adhesivity. These and other additives can be reduced or eliminated when practicing the present invention to improve cost and adhesive strength. Borax is well known to be detrimental to adhesive strength. One reason additives can be reduced is because the present invention inherently gives better control of achieving gelatinization temperatures.

Most applications of the present invention involve much greater contact area between the adhesive and the substrate, and have therefore less sensitivity to specific adhesivity. The process of the present invention is intrinsically less sensitive to adhesive viscosity.

Figure 1:
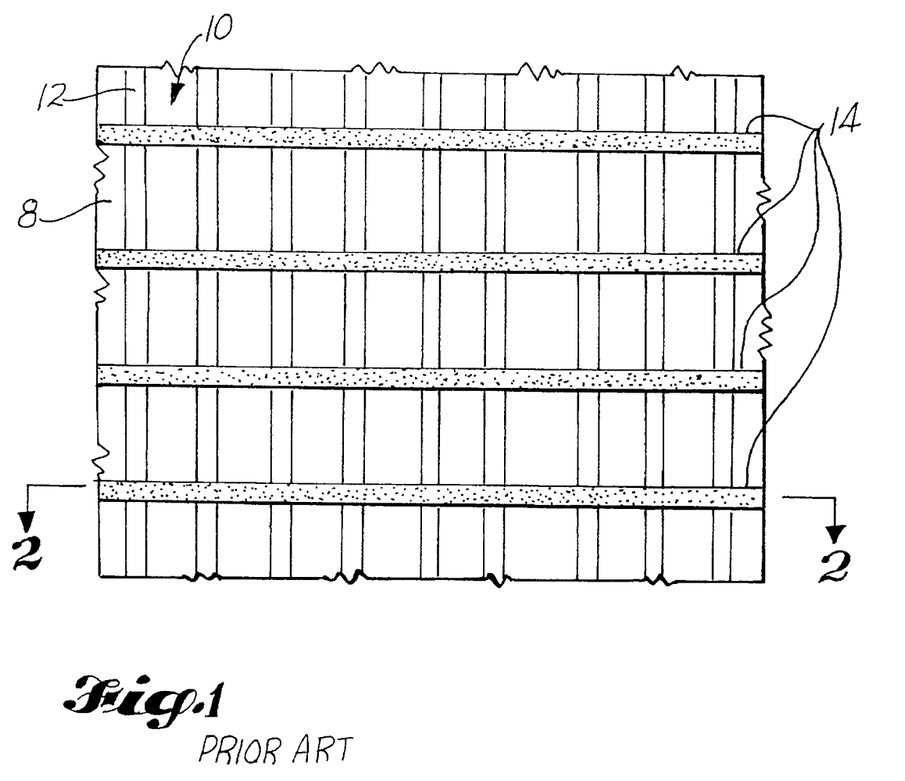
FIG. 1 is a partial plan view of continuous beads of adhesive placed transversely to the flutes of corrugated medium, as described in U.S. Pat. No. 5,316,828.
Figure 2:
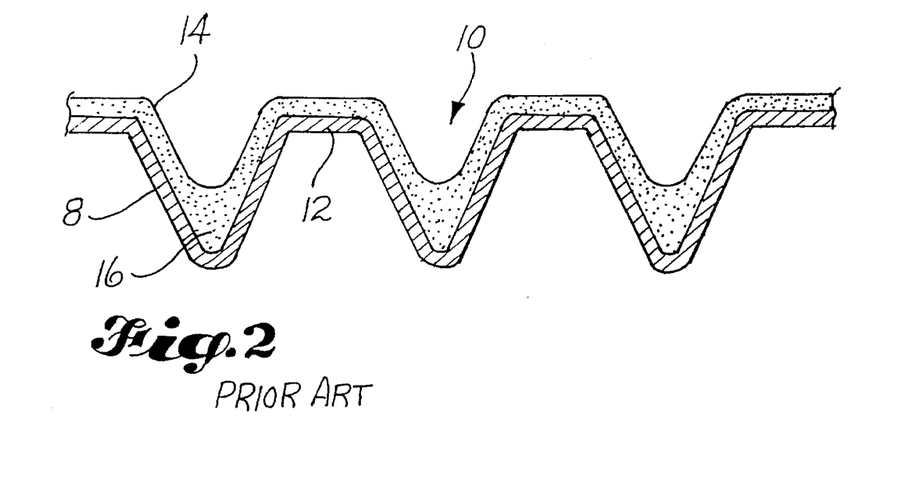
FIG. 2 is a cross sectional view taken along line 2—2 of FIG. 1.

Reference should now be made to the drawings for a full understanding of the invention. FIGS. 1 and 2 show the system of reinforcement of a corrugated board product described in U.S. Pat. No. 5,316,828. In the example shown, the corrugated medium is formed asymmetrically but the present invention applies equally to conventionally formed medium. A fluted medium 8 is formed with valleys 10 and peaks 12. Parallel beads of adhesive 14 are laid at right angles to the laterally oriented flutes. These flow into the valleys to form a reinforcing portion 16 that is effective in raising flat crush resistance. The patent did not describe any means of application of the adhesive nor was it specific to its composition other than to say that "it may be any suitable resinous, polymeric, or similar material that may be applied in liquid form and that will subsequently set up to a solid".

Figure 3:
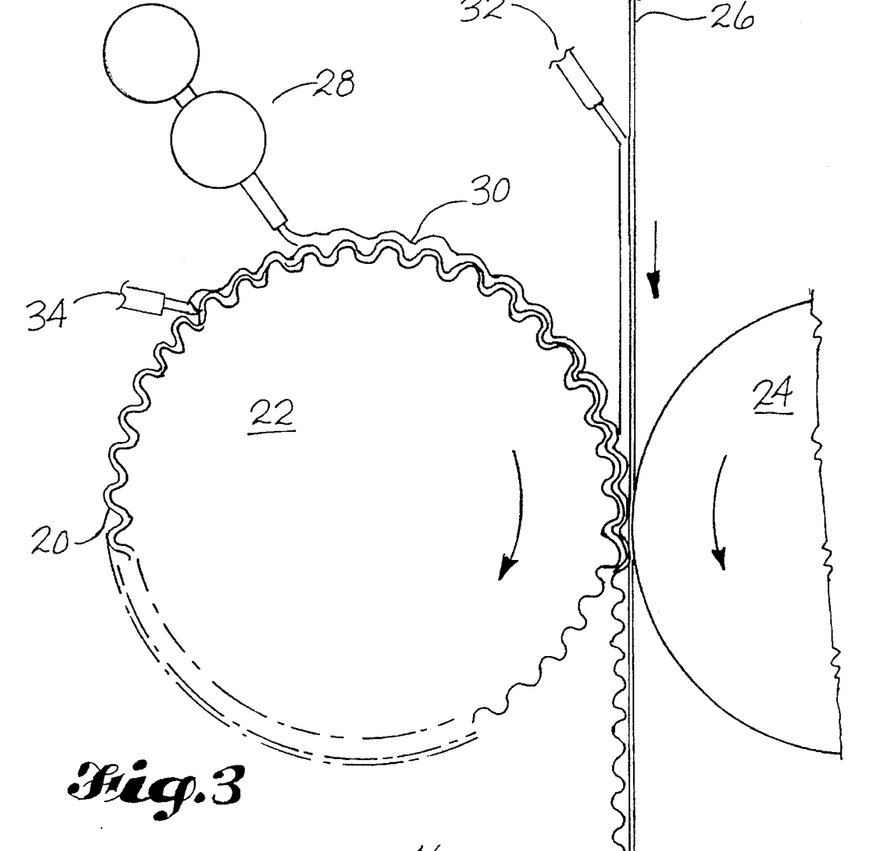
FIG. 3 shows a schematic elevation of one system for applying adhesive beads to a continuously moving corrugated material.
Figure 8:
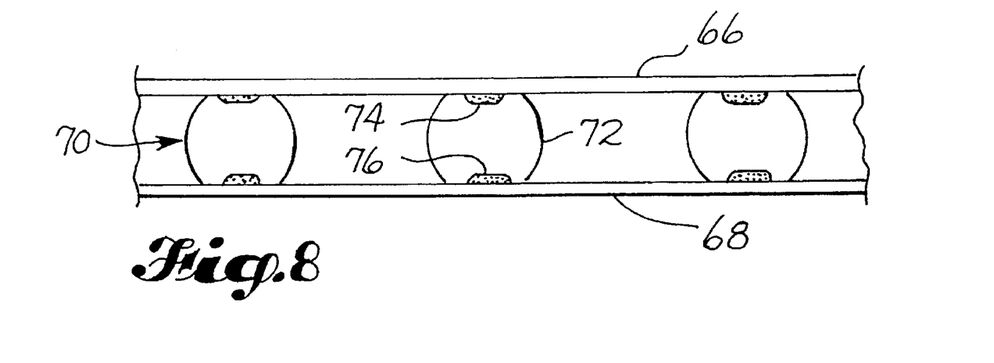
FIG. 8 is a cross sectional view of a panel using three element continuous beads of adhesive.

FIG. 3 shows one arrangement suitable for practice of the present invention. Corrugating medium 20 is running on the surface of a corrugating roll 22 which typically will be heated. A press roll 24 serves to press a face liner 26 against the medium. This is conventional practice in a corrugated paperboard plant. However, the usual liquid starch glue application system has been replaced by that of the present invention. Adhesive applicator device 28 applies a multiplicity of parallel spaced apart significantly gelatinized starch adhesive beads 30 between the corrugated medium and the liner. Optional supplemental adhesive applicator devices 32, 34 may be used to form two or three element beads, as seen in FIG. 8.

Figure 4:
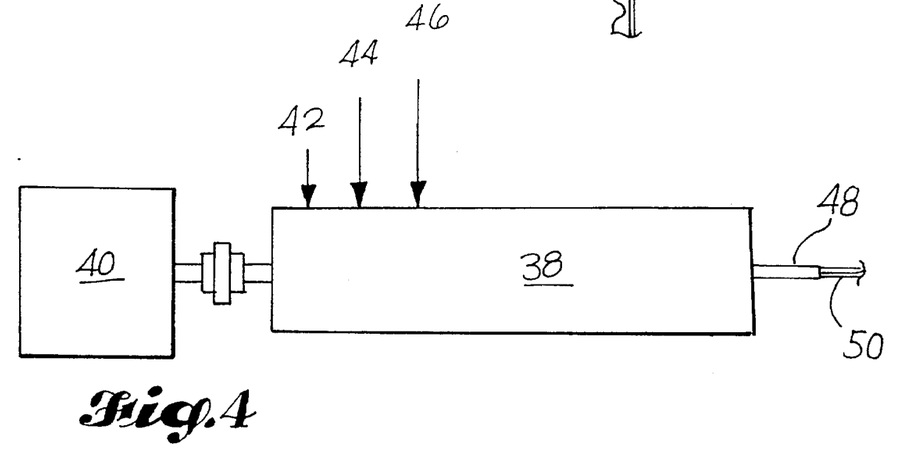
FIG. 4 shows a schematic elevation of a system for applying a starch-based adhesive which uses mechanical energy to gelatinize the starch suspension.

FIG. 4 shows one suitable type of gelatinized starch extrusion device. A commercially available extruder 38 has a drive motor 40. To this is supplied an essentially ungelatinized starch adhesive composition 42. A filler 44, such as sander dust, wood flour, finely ground agricultural residues, dried pulp mill sludge, etc. may optionally be included as may be a source of additional water and/or steam 46 as might be required. The mechanical action of the extruder creates heat to gelatinize the starch and provides pressure to extrude a multiplicity of adhesive beads 50 of the now significantly gelatinized adhesive through nozzles 48. Without intending to endorse this extruder over other available types and models, one suitable for the application is a model TX52, Made by Wenger Manufacturing, Inc., Sabetha, Kans.

Figure 5:
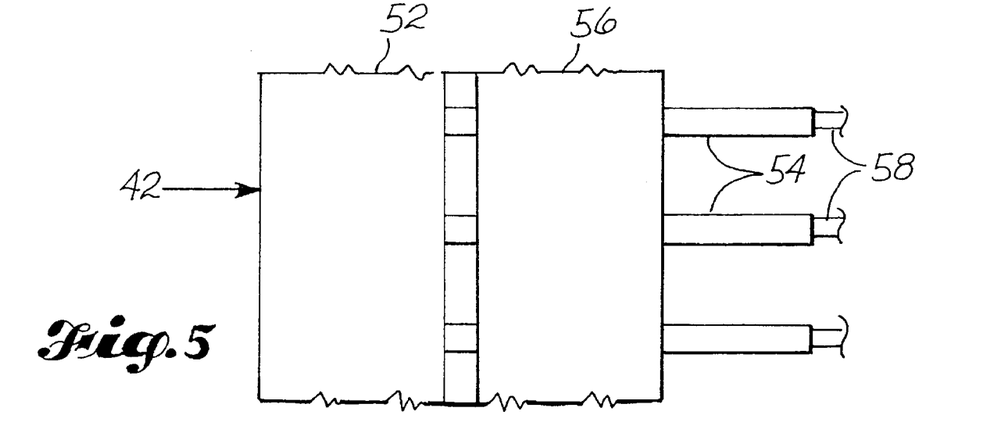
FIG. 5 shows a partial plan view of an alternative adhesive supply system using external heat for gelatinization.
Figure 6:
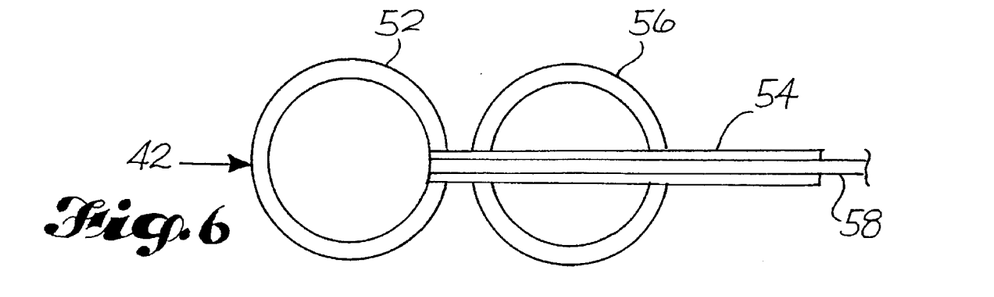
FIG. 6 is a cross section taken along line 6—6 of FIG. 5.

FIGS. 5 and 6 show an alternative adhesive applicator device to that of FIG. 4. A slurry of an essentially ungelatinized starch bearing composition 42 is provided to a distribution manifold 52 which spans the width of the material to be adhered. Multiple delivery tubes or nozzles 54 extend from the distribution pipe placed so as to deliver adhesive beads 58 in the desired pattern to the material to be adhered.

Figure 7:
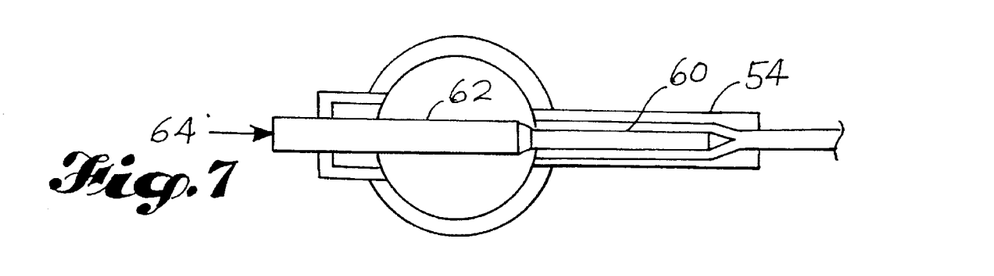
FIG. 7 is a cross sectional view showing an alternative location for the heat source used for gelatinization of a starch adhesive.

FIG. 7 shows a modified version of the adhesive applicator of FIGS. 5 and 6 in which the heat source is located in the center of delivery tubes 54. This may or may not be used in conjunction with heat from outside, as by chambers 56. Heat supply probes 60 are centrally located in delivery tubes 54. The section of the probe 62, which lies within the distribution pipe, is not a heating zone but is a support for the heating probe and is a conduit for the heat source 64. This portion of the probes can be insulated as is necessary. In this way a bead of gelatinized adhesive can be formed that varies across its cross section in degree of gelatinization. The major part of the cross sectional area could be significantly gelatinized but less gelatinized or essentially ungelatinized surface portions could remain. Depending on the particular starch used in the adhesive composition, the adhesivity at the surface of the beads could be considerably improved using this system.

Another embodiment of the invention is possible using an apparatus similar in configuration to that of FIG. 7. The probe 60 could be located in delivery nozzle 54 to act as a mandrel and produce hollow beads having a generally toroidal cross section; i.e., an annular ring. The probe can also be made hollow to inject a fluid such as cold or heated air into the center of the gelatinized starch beads in order to expand the diameter somewhat Both of these alternatives are useful to reduce adhesive consumption. A C-shaped bead would be especially useful because of its flexibility of configuration. In producing such a C-shape the heat supply probe 60 of FIG. 7 could be located off axis adjacent the wall of delivery tube 54.

FIG. 8 shows a section through a completed panel using three element adhesive beads generally shown at 70. A first continuous adhesive bead 72 of a gelatinized starch bearing composition is formed to provide the desired high volume and thickness necessary to act as a structural element of the panel. Continuous secondary supplemental adhesive beads 74, 76 may be used to provide better adhesion of the main bead 72 to interior panel surfaces of the face lamina 66, 68. The supplemental adhesive beads 74, 76 will normally be applied directly to the material to be adhered in order to enhance adhesion. When the principal bead of gelatinized starch 72 contacts the other two beads it can act as a heat source to increase the degree of gelatinization and the dryness level of the smaller beads when they are composed of a starch bearing composition. Supplemental adhesive 74, 76 can also be other compositions such as compatible hot melt adhesives.

Figure 9:
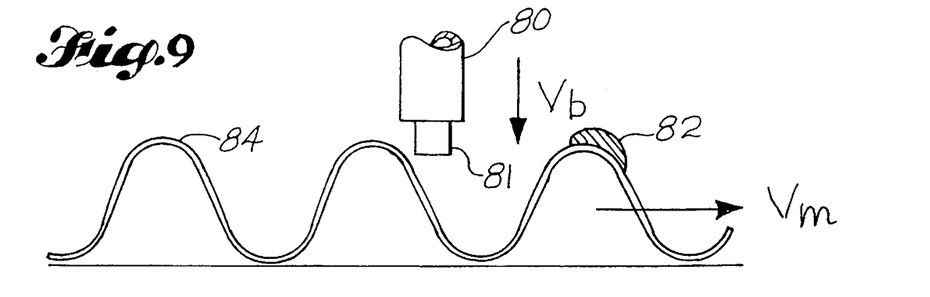
FIG. 9 shows a schematic elevation of an adhesive system for applying discontinuous transverse beads of adhesive on corrugated board.
Figures 10, 11, 12, 13, 14:
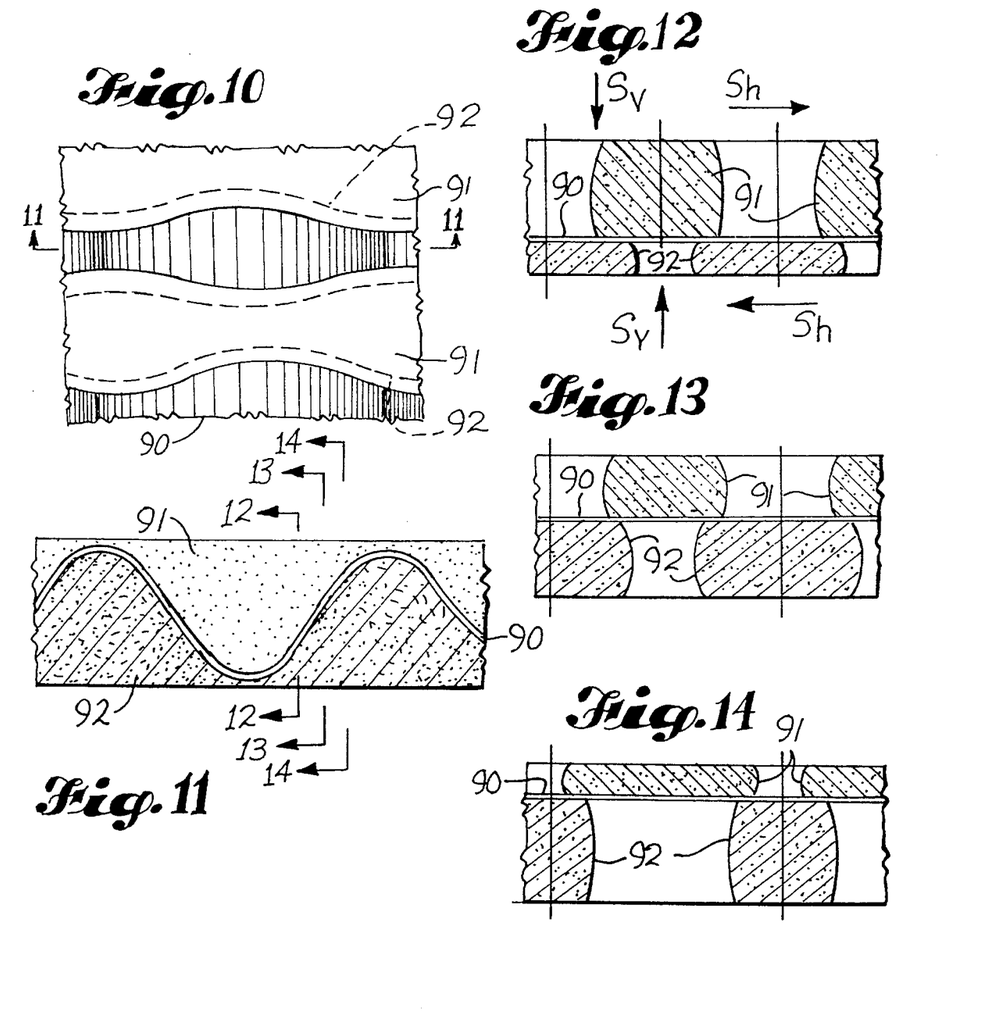
FIG. 10 is a plan view of a corrugated panel in which the gaps between adhesive beads on one side of the corrugated core member are covered by the beads on the other side of the core member.
FIG. 11 is a cross sectional elevation along line 11—11 of FIG. 10, taken across the corrugations of the core member.
FIGS. 12–14 are cross sectional elevations along lines 12—12, 13—13, and 14—14 respectively of FIG. 11, shown parallel to the corrugations of the core member.

FIG. 9 shows an arrangement of the adhesive delivery system to deposit discontinuous transverse beads of a starch composition. The adhesive delivery nozzles 80 are pointed generally at the tips 84 of the medium flutes. The discharge velocity $V_b$ of the adhesive beads 81 is lower than the forward velocity $V_m$ of the medium, such that the velocity of the beads and the cross sectional area of the beads create deposits 82 of the desired quantity of adhesive on to the flute tips of the medium.

FIGS. 10–14 show a corrugated panel in which reinforcing beads of a starch composition 91 and 92 are placed on each side of corrugated core member 90 in such a way that the gaps between parallel beads on one side of the core member are covered, in plan view, by the beads on the opposite side. Because of this feature, both vertical shear loads $S_v$ and horizontal shear loads $S_h$ can be borne entirely by the reinforcing beads without reference to the corrugated core member, other than any shear loading on the core member to bead interface, which is usually an adhesive bond. Under these conditions, the core member can be very light weight, with little strength in and of itself. For instance, the core member could be tissue paper.

Figure 15:
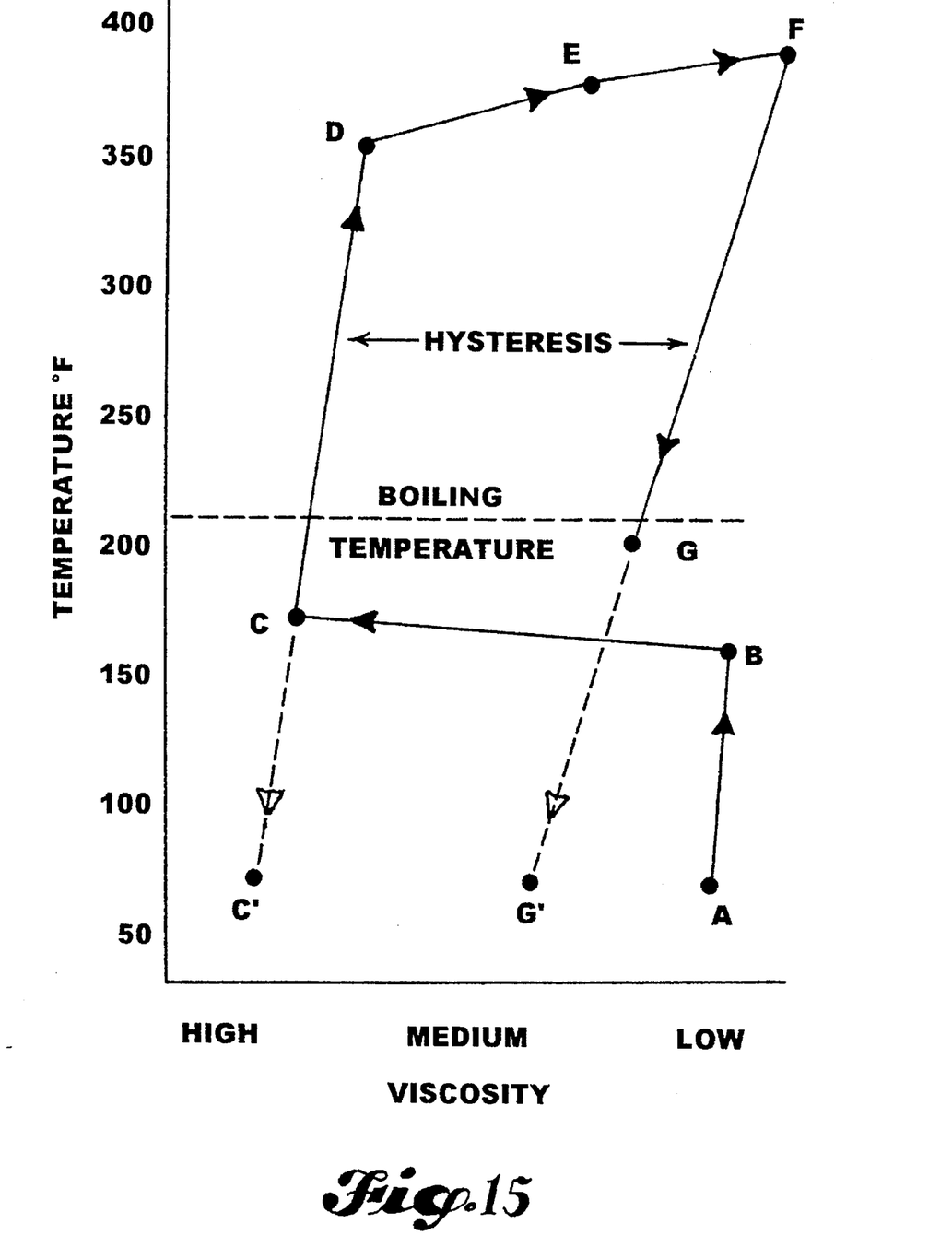
FIG. 15 is a graphical representation of a typical viscosity/temperature relationship for a starch bearing adhesive composition.

FIG. 15 shows a graphical representation of a typical viscosity/temperature relationship for a starch bearing composition undergoing a heating cooling cycle within a pressurized processing device. The estimates of viscosity and other conditions refer to tests on a 50% solids composition of a corn starch. Other starch types and compositions will vary somewhat from those of this example. For example, a 50% solids composition of commercial corn flour will have higher viscosities at all temperatures.

The pressurized container used for the following described tests included a transparent glass tube allowing observation and permitting visual judgments of the properties studied.

Referring to FIG. 15, the temperature rise from Point A to Point B represents the initial heating of the ungelatinized suspension of starch in water. There is only a very slight decrease in viscosity with temperature, as is typical of aqueous suspensions.

Increasing the temperature slightly from Point B to Point C shows the typical dramatic increase in viscosity as the starch suspension is heated to the gelatinization temperature and is gelatinized to a stiff gel. At this point it has a viscosity somewhat similar to that of a commercial petroleum jelly at room temperature. A bead of gel extruded at Point C will readily hold its shape and will dry in that form unless forcibly reshaped.

Increasing the temperature from Point C to Point D shows the gradual decrease in viscosity with temperature of the starch gel. At Point D a distinct softening occurs. If the gel at Point C is cooled to Point C' at ambient temperature the basic nature of the gel is unchanged.

The relatively small increase in temperature from Point D to Points E and F causes the composition to become very fluid. At that point it has a viscosity approximating that of a light weight SAE 10 motor oil.

As the composition is cooled from Point F to Point G the viscosity change (increase) is much lower than the incremental change (decrease) during the heating cycle. This hysteresis enables the extrusion of adhesive beads at Point G with the desired reduced viscosity, increased tack, and absence of puffing which would otherwise have been caused by flashing of the water in the composition upon extrusion at higher temperatures. The reduced rate of viscosity increase from Point F prevails all the way to ambient temperature at point G'.

Depending somewhat on the material being bonded, the adhesive may be applied to the substrate anywhere after Point B on FIG. 15 when the viscosity has exceeded 200 Stein-Hall seconds and where the degree of puffing and adhesivity will be satisfactory.

It is within the scope of the invention to press or roll a continuously formed panel to a selected total panel thickness. Thus, the glue line may be of an insignificant thickness or it may be of sufficient thickness to space the bonded members apart from each other.

It will be readily apparent to those skilled in the art that many variations are possible in the present process that have not been literally described yet fall within the spirit of the invention. As one example, the method could be readily used for such purposes as bonding the manufacturer's joint or for flap closure of corrugated boxes. Thus, the invention should be considered as limited only as it is defined in the following claims.

I claim:

1. A method of adhesively bonding two essentially continuous plies of material which comprises:

providing an application device adapted to extrude an adhesive material comprising a significantly gelatinized aqueous starch bearing composition, said composition being gelatinized within the application device to a viscosity greater than 200 seconds as determined by the Stein-Hall cup method;

extruding the starch bearing adhesive composition between the plies of material; and combining the plies to adhesively bond them one to the other.

2. The method of claim 1 which further comprises:

supplying an essentially ungelatinized starch bearing composition to the application device; and heating the ungelatinized starch bearing composition within the device to continuously gelatinize the starch to a significant degree immediately prior to application.

3. The method of claim 1 in which the application device includes a mechanical extruder and heat of gelatinization is supplied by the mechanical energy of the extruder.

4. The method of claim 1 in which, after significant gelatinization of the starch bearing adhesive composition within the application device, the composition is further heated within the application device to a temperature near or above the melting temperature of the starch bearing composition before extruding the starch bearing composition between the plies of material.

5. The method of claim 4 in which after heating the starch bearing composition to near or above the melting temperature, the composition is cooled within the application device to a temperature below about 150° C. to reduce expansion and density reduction of the starch bearing composition caused by flashing of the water in the composition upon extrusion.

6. The method of claim 1 in which the plies remain spaced apart by the starch beads after the plies are combined.

7. The method of claim 1 in which the plies are pressed into close proximity after combining.

8. The method of claim 1 in which a supplemental adhesive is applied between at least one of the plies of material and the significantly gelatinized starch bearing composition beads.

9. The method of claim 1 in which the beads of adhesive applied to the plies of material have a significantly gelatinized core portion and a less gelatinized surface portion.

10. The method of claim 1 in which the adhesive is applied as a multiplicity of spaced apart continuous beads.

11. The method of claim 1 in which the adhesive is applied as a continuous full width ribbon.

12. A method of making a corrugated paperboard product which comprises:

providing a corrugated paper medium ply;

further providing a linerboard face sheet ply;

continuously extruding an aqueous starch bearing adhesive composition between the plies in a direction normal to the corrugations using an adhesive application device, said adhesive composition being gelatinized within the application device to a viscosity greater than 200 seconds as determined by the Stein-Hall cup method; and pressing the plies together to adhesively bond them.

13. The method of claim 12 in which, after significant gelatinization of the starch bearing adhesive composition within the application device, the composition is further heated within the application device to a temperature near or above the melting temperature of the starch bearing composition before extruding the beads of the composition between the plies.

14. The method of claim 13 in which after heating the starch bearing composition to near or above the melting temperature, the composition is cooled within the application device to a temperature below about 150° C. to reduce expansion and density reduction of the starch bearing composition caused by flashing of the water in the composition upon extrusion.

15. The method of claim 12 in which the adhesive is extruded as a multiplicity of spaced apart continuous beads.

16. The method of claim 12 in which the adhesive is extruded as a continuous side-to-side ribbon.

17. The method of claim 12 in which the adhesive composition is extruded in a manner as to be deposited on the tips and the upper portions of the corrugated medium flutes and to be absent on the lower portions of the valleys of the flutes of the medium before pressing the plies together to adhesively bond them.

18. The method of claim 17 in which the adhesive is extruded as a multiplicity of spaced apart continuous beads.

19. The method of claim 17 in which the adhesive is extruded as a continuous side-to-side ribbon.

20. A method of manufacturing an essentially continuous panel product in which a continuous corrugated core member is provided having laterally oriented corrugated flutes and having first and second sides which comprises:

providing an application device adapted to continuously extrude a multiplicity of side-by-side spaced apart continuous beads of an adhesive material comprising a significantly gelatinized aqueous starch bearing composition, said composition being gelatinized within the application device to a viscosity greater than 200 seconds as determined by the Stein-Hall cup method, gaps being present between adjacent beads;

extruding the gelatinized starch bearing composition onto the first and second sides of the corrugated core member, the spacing of the continuous parallel beads of adhesive and the width of the beads being such that when the completed panel is viewed in plan the gaps between the parallel beads on one side are covered by the parallel beads on the other side.

21. The method of claim 20 in which the spaced apart continuous beads of starch bearing composition, after being gelatinized within the application device, are further heated within the application device to a temperature near or above the melting temperature of the starch bearing composition before being extruded onto the corrugated core member.

22. The method of claim 21 in which after heating the starch bearing composition to near or above the melting temperature, the composition is cooled within the application device to a temperature below about 150° C. to reduce expansion and density reduction of the starch bearing composition caused by flashing of the water in the composition upon extrusion.

23. The method of claim 20 in which, after extrusion of the continuous parallel beads of adhesive onto the corrugated core member, the panel is rolled or pressed to a selected total panel thickness.

24. The method of claim 20 in which at least one continuous face sheet ply is added to the panel.

* * * * *